United States Patent Office 3,124,534
Patented Mar. 10, 1964

3,124,534
CORROSION INHIBITOR
James K. O'Brien, Montclair, and Howard B. Trombley, Caldwell, N.J., assignors to Maco, Incorporated, Caldwell, N.J., a corporation of New Jersey
No Drawing. Filed Aug. 1, 1958, Ser. No. 752,405
26 Claims. (Cl. 252—147)

This invention relates to the chemical treatment of chemical processing equipment which has become fouled by the deposition of heavy insoluble scale on the liquid contacting surface thereof, and, in particular, it is concerned with an acid treatment of such equipment by which the scale is softened, dissolved, or disintegrated in an acid medium and removed from the equipment without material acid corrosion of the metal surfaces of the equipment itself.

This application is a continuation-in-part of U.S. application Ser. No. 561,152, filed January 24, 1956, and now abandoned.

It is common practice, for example, in the treatment of boiler feed-water to utilize carbonates or phosphates to soften the water. However, the effluents from both acid and hot lime-soda softening processes will be saturated with calcium carbonate at the temperature of the softening operation and, accordingly, when there is any increase in the temperature of the softened water, a supersaturated condition is created which ultimately results in the deposition of calcium carbonate scale. By way of similar reactions, phosphate deposits can be formed on the liquid contacting surfaces of equipment. These reactions also include the formation of iron hydroxides and deposition of certain amounts of silica. Where the scale is deposited in glass lined vats, mechanical cleaning is impossible and the presence of scale is merely tolerated.

Whatever the mechanism of reaction, the scale formed in chemical processing equipment involving the handling of water is characterized chiefly by the presence of calcium and magnesium with carbonate and phosphate radicals. It is highly insoluble and over a period of time substantial thicknesses will form in conduits to reduce the effective diameter thereof and thereby impede liquid flow.

It is accordingly a fundamental object of this invention to provide chemical solutions useful for softening and disintegrating scale deposited in processing equipment.

It is another object of the invention to provide an acid soaking solution useful to dissolve deposited scale from equipment, the acid being conditioned to inhibit the corrosion of metal surfaces on which the scale is deposited.

It is another object of the invention to provide a composition and method useful for application to the cleaning of scale from glass-lined chemical processing equipment.

Other objects and advantages of the invention will in part be obvious and in part appear hereinafter.

The invention accordingly resides in a cleaning composition characterized by its containing a polybasic mineral acid and a balanced corrosion inhibitor composition formed of a plurality of ingredients, the proportion of the inhibitor in the acid being an amount sufficient substantially to inhibit corrosion of metal surfaces in liquid conduit lines and heat exchangers and similar processing apparatus. The combination of ingredients in the cleaning composition consists of an acid substance selected from the group consisting of sulfuric, sulfamic and phosphoric acids and an alkali metal bisulfate (acid sulfate) in major amount together with a minor proportion of an inhibitor, in the amount of 3–10 percent of the acid by weight. The inhibitor is characterized by its containing, in combination, an alkali metal compound selected from the group consisting of alkali metal phosphates, alkali metal borates and mixtures thereof, an organic sulfur compound such as a lower alkyl thiourea and a complex organic reaction product of an organic chloride with a coal tar base and with a substance selected from the group consisting of water-soluble inorganic thiocyanates and thiourea as described in Patent No. 2,403,153, said complex organic reaction product being sold commercially as Rodine pickling inhibitor by American Chemical Paint Company, assignee of said patent. The inhibitor is preferably characterized by the presence of a major amount of alkali metal borate-phosphate blend, the remaining portion of it comprising balancing ingredients, so that the acid cleaning composition is effective to avoid substantial corrosive effect on the metal surface, but the solvent effect of the acid on the scale formed in the equipment is unimpeded.

The complex organic reaction product referred to above is described in U.S. Patent 2,403,153 as formed by heating and chemically reacting the following materials: an organic chloride chosen from the group consisting of ethylene dichloride, propylene dichloride, dichloroethyl ether, dichloroisopropyl ether, triglycol dichloride, tetraglycol dichloride, benzyl chloride, and naphthyl methyl chloride, a cyclic coal tar base, and a substance chosen from the group consisting of water-soluble inorganic thiocyanates and thiourea. Examples of cyclic coal tar bases given in the patent are pyridines, any of the individual lutidines, picolines or collidines, quinoline, substituted quinolines, or commercial cuts known as crude pyridine bases, crude quinoline fraction, a crude quinoline from which quinoline itself has been removed, and the like. Examples of water-soluble inorganic thiocyanates include thiocyanates of ammonia, alkali metals or alkaline earth metals.

The composition may preferably be formulated as a complete inhibited acid, ready for use, in which the acid, in relatively high concentration, is mixed with the corrosion inhibitor and, in ultimate use, the combined mixture is diluted to an appropriate strength, the ratio of acid to inhibitor being preferably established in the range 30–20 to 1 by weight. The inhibiting composition may be prepared as a separate formulation consisting essentially of a blend of the inhibiting ingredients comprising 50–95% by weight of the alkali metal phosphate-borate blend with the remainder being the balancing ingredients with the alkyl thiourea and organic chloride complex reaction product present in the weight ratio of 3:1 to 1:3.

The method of removing scale from liquid processing system is characterized by the technique of adding the inhibited acid composition to water and circulating the diluted acid in the desired concentration through the system being cleaned to bring about effective contact and ultimate disintegration of the scale with the acid. Where the cleaning of glass lined vats or conduits must be carried out, the vat is filled with the acid composition and permitted to soak, with agitation, for a period sufficient to bring about disintegration of the scale.

To illustrate the application of the invention to practical conditions, certain tests were carried out to show the effectiveness of the inhibited acid for dissolving and disintegrating samples of scale removed from processing equipment, while comparing the extent to which the same acid compositions attack a variety of metals such as are encountered in a chemical processing system.

In all of the following examples a standard experiment simulating operating conditions was carried out as follows:

The metal or scale sample was submerged in 500 cc. or one-half liter of acid of the indicated strength and the temperature held within the range indicated for the duration of the test; the acid was agitated as it would be in an actual cleaning operation. Prior to adding the metal samples they were cleaned of oil or oxide film, dried and weighed to 0.0001 gram. Following the experiment, metal samples were washed with water, dried and weighed and weight losses are reported.

The iron samples were soft iron fittings such as are used in assembling apparatus: copper, zinc, brass, stainless steel and Admiralty metal were in the form of small strips 3 inches long by 1½ inches wide.

In uninhibited acid the zinc specimens were entirely consumed; stainless steel, iron, copper badly pitted by progressive corrosion.

For a first series of tests, the following composition was used as the inhibitor:

Example I

| | |
|---|---|
| $Na_2B_4O_7$ gran | 84 lbs. |
| $Na_5P_3O_{10}$ gran | 4 lbs. |
| Dibutylthiourea | 3 lbs. 11 oz. |
| Complex organic reaction product (Rodine #113) | 3 lbs. 11 oz. |
| | 94 lbs. 22 oz. |

This inhibitor gave excellent results but in order to improve its physical characteristics, such as wetting the scales thoroughly, and improve its solubility, a wetting agent and an organic acid were added; however, they were not essential to carrying out the invention. The inhibitor used in the tests is as follows:

Example IA

| | |
|---|---|
| $Na_2B_4O_7$ gran | 84 lbs. |
| $Na_5P_3O_{10}$ gran | 4 lbs. |
| Dibutylthiourea | 3 lbs. 11 oz. |
| Complex organic reaction product (e.g. Rodine #113 by American Chem. Paint Co.) | 3 lbs. 11 oz. |
| $H_2C_2O_4$ gran | 2 lbs. |
| Wetting agent (e.g. Pluronic #68) | 2 lbs. 10 oz. |
| | 100 lbs. |

This inhibitor composition is characterized by the presence of borax and sodium pyrophosphate (i.e. sodium tripolyphosphate) as the principal ingredients in an overall composition containing an alkyl-thiourea as the sulfur compound, and the complex organic reaction product sold commercially as Rodine as described herein. Both the sulfur compound and the latter product should be of sufficiently low molecular weight to be water soluble, yet heavy enough to be substantially non-volatile at the 153–200° F. operating temperature level. The proportions given are preferred quantities, but it is to be understood that the major constituents of this inhibitor are the borax and phosphate, which may be present in total combined amount of 50 parts by weight to 95 parts by weight. Variation of the remaining balancing ingredients is permissible, but the relative ratio of organic sulfur compound to the complex organic reaction product is kept in the range from about 3:1 to 1:3. The wetting agent which, as stated before, need not be present, is used to assist in the penetration of the densely packed scale and need not exceed 3 or 4 percent of the total combination inhibitor composition. The organic acid (oxalic acid), which is also optional, aids, as stated above, in making the combination inhibitor easily soluble and may be omitted if desired.

A sequence of experiments was carried out in which scale samples from a boiler, which were characterized by the presence of calcium and magnesium phosphates and carbonates, were exposed to the acid to determine its effectiveness inhibited with the said composition in dissolving and disintegrating the scale.

Results of such tests with sulfamic acid are summarized as follows:

Example II

[Temp. 150–160° F.]

| Metal Exposed | 10% Aqueous Sulfamic Acid Solution with 0.5% Inhibitor of Example IA | |
|---|---|---|
| | Metal loss 4 hrs., gms. | −Percent loss 4 hrs. |
| Iron (soft) | 0.0005 | 0.0021 |
| Iron (hard) | 0.0015 | 0.015 |
| Admiralty Metal | None | None |
| Copper (sheet, pure) | None | None |
| Brass (shell) | 0.0010 | 0.020 |
| Stainless steel | None | None |
| Zinc (sheet, pure) | 0.6025 | 4.3 |

Scale sample—disintegrated.
Scale sample in uninhibited acid—disintegrated.
Metal samples in uninhibited acid—continuous progressive reaction.

The experiments were conducted for a period of 4 hours. The metal samples and scale were submerged in 500 cc. of the aqueous acid. In that time it was observed that the scale samples were all completely disintegrated to a powder where they were not dissolved completely. The 10 percent aqueous sulfamic acid is typical of an optimum concentration useful for cleansing purposes; this may be as low as 5 percent or less (e.g. 3%) for effective activity or it may be as high as 20 percent. The ratio of sulfamic acid to inhibitor is preferably fixed so that the amount of sulfamic acid is preferably 10 to 20:1.

In all cases it is to be noted that the sulfamic acid, as inhibited, over a period of 4 hours either dissolved no base metal or dissolved only an insignificant amount; also whether the acid was inhibited or not, the scale was completely disintegrated.

When the inhibitor did not comprise the balanced composition, the improved results were not obtained. For example, when the borate-phosphate blend was omitted, the following inferior results were obtained:

Example IIA

[Temp. 150–160° F.]

| Metal Exposed | 10% Aqueous Sulfamic Acid Solution with 0.5% Inhibitor Without Phosphate or Borate | |
|---|---|---|
| | Metal loss 4 hrs., gms. | −Percent loss 4 hrs. |
| Iron | .0332 | .3472 |
| Steel (Stainless) | .0065 | .0175 |
| Copper | .0009 | .0102 |
| Zinc | .6190 | 4.5957 |
| Admiralty Metal | .0060 | .0186 |

When dibutylthiourea and the complex organic reaction product were omitted, the results obtained were likewise inferior as follows:

Example IIB

[Temp. 150–160° F.]

| Metal Exposed | 10% Aqueous Sulfamic Acid Solution with 0.5% Inhibitor Without Dibutylthiourea and Complex Reaction Product | |
|---|---|---|
| | Metal loss 4 hrs., gms. | −Percent loss 4 hrs. |
| Iron | .0093 | .1138 |
| Steel (Stainless) | .0054 | .0141 |
| Zinc | 1.5464 | 34.2677 |
| Copper | None | None |
| Admiralty Metal | .0077 | .0239 |

It will be noted by comparing the results of Example IIA (inhibitor without phosphate and borate) and IIB (inhibitor without dibutylthiourea and Rodine) with those of Example II that, when the fully balanced inhibitor is used as in Example II, the beneficial effect is highly synergistic.

Example III

Similar experiments using the same procedure were carried out using phosphoric acid inhibited with the composition described in Example IA, with the ratio of phosphoric acid to that of the inhibitor as follows:

[Temp. 150–160° F.]

| Metal Exposed | 10% Aqueous Phosphoric Acid Solution with 0.5% Inhibitor of Example IA | |
|---|---|---|
| | Metal loss 4 hrs., gms. | −Percent loss 4 hrs. |
| Iron (soft) | 0.0180 | 0.0783 |
| Iron (hard) | 0.0050 | 0.0525 |
| Admiralty Metal | 0.0090 | 0.0281 |
| Copper (sheet, pure) | None | None |
| Brass (shell) | 0.0020 | 0.0410 |
| Stainless Steel | 0.0027 | 0.0075 |
| Zinc (sheet, pure) | 0.460 | 4.41 |

Scale samples—disintegrated.
Scale samples in uninhibited acid—disintegrated.
Metal samples in uninhibited acid—progressive continuous corrosion.
Metal and scale samples were submerged in 500 cc. acid.

The 10 percent concentration of phosphoric acid is a preferred working level, but it may be varied from about 3 to 20 percent. Since scale dissolves and disintegrates, concentrations in the lower range are preferred, because they give an effective acid which remains fluid with the suspended disintegrated scale in it.

Similar inferior results were obtained as in Examples IIA and IIB when an unbalanced inhibitor composition was used.

Example IV

Half neutralized sulfuric acid or sodium bisulfate in 10 percent solution inhibited with the composition described in Example IA was used in a like sequence of experiments with the following results:

[Temp. 150–160° F.]

| Metal Exposed | 10% Aqueous Sodium Bisulfate Solution (Com. grade) with 0.5% of Inhibitor of Example IA | |
|---|---|---|
| | Metal loss 4 hrs., gms. | −Percent loss 4 hrs. |
| Iron (soft) | None | None |
| Iron (hard) | 0.001 | 0.015 |
| Admiralty Metal | None | None |
| Copper (sheet, pure) | None | None |
| Brass (shell) | 0.0045 | 0.097 |
| Stainless Steel | None | None |
| Zinc (sheet, pure) | 0.2370 | 1.69 |

Scale samples—disintegrated.
Scale samples in uninhibited acid—disintegrated.
Metal samples in uninhibited acid—progressive deterioration and solution of metal.
Metal and scale samples were submerged in 500 cc. acid.

The range of concentration useful is from about 3 percent by weight to about 20 percent, with 10 percent a preferred useful level.

Example V

[Temp. 150–160° F.]

| Metal Exposed | 10% Aqueous Sulfuric Acid Solution with 0.5% Inhibitor of Example IA | |
|---|---|---|
| | Metal loss 4 hrs., gms. | −Percent loss 4 hrs. |
| Iron (soft) | 0.0325 | 0.1472 |
| Iron (hard) | 0.0020 | 0.20 |
| Admiralty Metal | 0.002 | 0.0063 |
| Copper (sheet, pure) | None | None |
| Brass (shell) | 0.005 | 0.110 |
| Stainless Steel | 0.011 | 0.0287 |
| Zinc (sheet, pure) | 4.029 | 43.8 |

Scale samples—disintegrated.
Scale samples in uninhibited acid—disintegrated.
Metal samples in uninhibited acid—progressive and continuous corrosion.

The range of concentration useful is from about 3 percent by weight to about 20 percent, with 10 percent a preferred useful level.

A variant of the inhibitor composition is illustrated in the following example:

Example VI

| | |
|---|---|
| $Na_5P_3O_{10}$ | 88 lbs. |
| Dibutylthiourea | 3 lbs. 11 oz. |
| Complex organic reaction product (Rodine #113) | 3 lbs. 11 oz. |
| | 94 lbs. 22 oz. |

While excellent inhibiting results were obtained with this inhibitor, oxalic acid and a wetting agent were used as in Example IA as follows to improve the physical characteristics:

Example VIA

| | |
|---|---|
| $Na_5P_3O_{10}$ | 88 lbs. |
| Dibutylthiourea | 3 lbs. 11 oz. |
| Complex organic reaction product (Rodine #113) | 3 lbs. 11 oz. |
| $H_2C_2O_4$ | 2 lbs. |
| Wetting agent (Pluronic #68) | 2 lbs. 10 oz. |
| | 100 lbs. |

It will be noted that this alternative inhibitor formulation differs from the one given in Example IA in eliminating the borax and utilizing an amount of sodium tripolyphosphate equivalent to the total amount of these two ingredients in the original composition. The remaining balancing ingredients are present in substantially the same indicated proportions.

The sequence of tests of this composition parallels those given in Examples II, III, IV and V, and was carried out to measure the effectiveness of the inhibited acid in disintegrating scale and in its corrosiveness on the same variety of metals. Results are summarized in Examples VII, VIII, IX and X, where in each instance, a 10% acid solution containing 0.5% of the inhibitor was used as the acidizing medium.

Example VII

[Temp. 150–160° F.]

| Metal Exposed | 10% Aqueous Sulfamic Acid Solution with 0.5% Inhibitor of Example VIA | |
|---|---|---|
| | Metal loss 4 hrs., gms. | −Percent loss 4 hrs. |
| Iron (soft) | None | None |
| Iron (hard) | None | None |
| Admiralty Metal | None | None |
| Copper (sheet, pure) | 0.0020 | 0.020 |
| Brass (shell) | None | None |
| Stainless Steel #342-1 | None | None |
| Zinc (sheet, pure) | 2.693 | 20.7 |

Scale samples—disintegrated.
Scale samples in uninhibited acid—disintegrated.
Metal samples in uninhibited acid—disintegrated, progressive and continuous corrosion.

Useful acid concentration range is from about 3 to about 20% with 10% a preferred level.

Example VIII

[Temp. 150–160° F.]

| Metal Exposed | 10% Aqueous Phosphoric Acid Solution with 0.5% Inhibitor of Example VIA | |
|---|---|---|
| | Metal loss 4 hrs., gms. | −Percent loss 4 hrs. |
| Iron (soft) | 0.003 | 0.013 |
| Iron (hard) | 0.001 | 0.010 |
| Admiralty Metal | 0.0045 | 0.014 |
| Copper (sheet, pure) | None | None |
| Brass (shell) | 0.008 | 0.172 |
| Stainless Steel #342-1 | 0.0022 | 0.006 |
| Zinc (sheet, pure) | 2.324 | 28.0 |

Scale samples—disintegrated.
Scale samples in uninhibited acid—disintegrated.
Metal samples in uninhibited acid—progressive and continuous corrosion.

Useful concentrations giving comparable results vary from about 3 to about 20%, with 10% the preferred working level.

Example IX

[Temp. 150–160° F.]

| Metal Exposed | 10% Aqueous Sodium Bisulfate Solution with 0.5% of Inhibitor of Example VIA | |
|---|---|---|
| | Metal loss 4 hrs., gms. | −Percent loss 4 hrs. |
| Iron (soft) | None | None |
| Iron (hard) | 0.0015 | 0.015 |
| Admiralty Metal | 0.0075 | 0.023 |
| Copper (sheet, pure) | None | None |
| Brass (shell) | 0.0070 | 0.143 |
| Stainless Steel | None | None |
| Zinc (sheet, pure) | 2.4015 | 23 |

Scale samples—disintegrated—some residue.
Scale samples in unhibited acid—disintegrated.
Metal samples in uninhibited acid—progressive and continuous corrosion.

Useful concentrations giving comparable results range from about 3 to about 20% with 10% a preferred level.

Example X

[Temp. 150–160° F.]

| Metal Exposed | 10% Aqueous Sulfuric Acid Solution with 0.5% Inhibitor of Example VIA | |
|---|---|---|
| | Metal loss 4 hrs., gms. | −Percent loss 4 hrs. |
| Iron (soft) | 0.2962 | 1.9 |
| Iron (hard) | 0.001 | 0.014 |
| Admiralty Metal | 0.003 | 0.0092 |
| Copper (sheet, pure) | None | None |
| Brass (shell) | 0.0144 | 0.29 |
| Stainless Steel | 0.002 | 0.0052 |
| Zinc (sheet, pure) | 3.8853 | 39.0 |

Scale samples in uninhibited acid—disintegrated.
Metal samples in uninhibited acid—progressive and continuous corrosion.

Useful concentrations giving comparable results range from about 3 percent to about 20 percent with 10 percent a preferred level.

Example XI

[Temp. 150° F.]

| Metal Exposed | 10% Aqueous Sulfamic Acid Solution with 0.5% Inhibitor of Example VI | |
|---|---|---|
| | Metal loss 4 hrs., gms. | −Percent loss 4 hrs. |
| Iron (soft) | 0.0090 | 0.039 |
| Iron (hard) | 0.0042 | 0.044 |
| Admiralty Metal | 0.010 | 0.031 |
| Stainless Steel | 0.0015 | 0.0041 |
| Zinc (sheet, pure) | 1.050 | 7.1 |

Scale samples—attacked strongly—disintegrated.
Scale samples in uninhibited acid—disintegrated.
Metal samples in uninhibited acid—progressive and continuous corrosion.

A third variation of the inhibitor formula is illustrated in the following example.

Example XII

| | |
|---|---|
| $Na_2B_4O_7$ | 44 lbs. |
| $Na_5P_3O_{10}$ | 44 lbs. |
| Dibutylthiourea | 3 lbs. 11 oz. |
| Complex organic reaction product (Rodine #113) | 3 lbs. 11 oz. |
| | 95 lbs. 6 oz. |

While excellent results were obtained with this composition, oxalic acid and a wetting agent were likewise added to improve the physical quality of the inhibitor as follows:

Example XIIA

| | |
|---|---|
| $Na_2B_4O_7$ | 44 lbs. |
| $Na_5P_3O_{10}$ | 44 lbs. |
| $H_2C_2O_4$ | 2 lbs. |
| Dibutylthiourea | 3 lbs. 11 oz. |
| Complex organic reaction product (Rodine #113) | 3 lbs. 11 oz. |
| Wetting agent (Pluronic #68) | 2 lbs. 10 oz. |
| | 100 lbs. |

The formula is characterized by the fact that the borate and phosphate are present in equal proportions and the remaining balancing ingredients are present in substantially the same relationships previously indicated.

A sequence of tests was carried out also using formula XIIA to determine the effectiveness of the acids in dissolving scale and the effectiveness of the inhibitor in preventing corrosion of metal by the inhibited acid.

Example XIII

[Temp. 150–160° F.]

| Metal Exposed | 10% Aqueous Sulfamic Acid Solution with 0.5% Inhibitor of Example XIIA | |
|---|---|---|
| | Metal loss 4 hrs., gms. | −Percent loss 4 hrs. |
| Iron (soft) | .006 | .032 |
| Iron (hard) | None | None |
| Admiralty Metal | .001 | .0092 |
| Copper (sheet, pure) | .0002 | .0019 |
| Stainless Steel 347-A3 | None | None |
| Brass (shell) | None | None |
| Zinc (sheet, pure) | 2.108 | 17.2 |

Scale samples—disintegrated.
Scale samples in uninhibited acid—disintegrated.
Metal samples in uninhibited acid—progressive and continuous corrosion.

Example XIV

[Temp. 150–160° F.]

| Metal Exposed | 10% Aqueous Phosphoric Acid Solution with 0.5% Inhibitor of Example XIIA | |
|---|---|---|
| | Metal loss 4 hrs., gms. | −Percent loss 4 hrs. |
| Iron (soft) | 0.001 | 0.054 |
| Iron (hard) | None | None |
| Admiralty Metal | None | None |
| Copper (sheet, pure) | None | None |
| Brass (shell) | 0.008 | 0.172 |
| Stainless steel 347-A3 | None | None |
| Zinc (sheet, pure) | 1.396 | 16.5 |

Scale samples—disintegrated.
Scale samples in uninhibited acid—disintegrated.
Metal samples in uninhibited acid—progressive and continuous corrosion.

Example XV

[Temp. 150–160° F.]

| Metal Exposed | 10% Aqueous Sodium Bisulfate Solution with 0.5% Inhibitor of Example XIIA | |
|---|---|---|
| | Metal loss 4 hrs., gms. | −Percent loss 4 hrs. |
| Iron (soft) | 0.004 | 0.021 |
| Iron (hard) | None | None |
| Admiralty Metal | None | None |
| Copper (sheet, pure) | 0.003 | 0.029 |
| Brass (shell) | None | None |
| Stainless Steel | None | None |
| Zinc (sheet, pure) | 2.045 | 19.0 |

Scale samples—disintegrated.
Scale samples in uninhibited acid—disintegrated.
Metal samples in uninhibited acid—progressive and continuous corrosion.

Example XVI

[Temp. 150–160° F.]

| Metal Exposed | 10% Sulfuric Acid Solution with 0.5% Inhibitor of Example XIIA | |
|---|---|---|
| | Metal loss 4 hrs., gms. | −Percent loss 4 hrs. |
| Iron (soft) | 0.1725 | 0.77 |
| Iron (hard) | 0.0035 | 0.050 |
| Admiralty Metal | 0.0058 | 0.010 |
| Copper (sheet, pure) | None | None |
| Brass (shell) | 0.005 | 0.110 |
| Stainless Steel | None | None |
| Zinc (sheet, pure) | 3.358 | 26.0 |

Scale samples—disintegrated.
Scale samples in uninhibited acid—disintegrated.
Metal samples in uninhibited acid—progressive and continuous corrosion.

A further variation in the composition of the inhibitor is illustrated by the following example:

Example XVII

| | |
|---|---|
| $Na_2B_4O_7$ | 44 lbs. |
| $Na_3PO_4$ | 44 lbs. |
| Dibutylthiourea | 3 lbs. 11 oz. |
| Complex organic reaction product (Rodine) | 2 lbs. 10 oz. |
| Wetting agent (Pluronic) | 3 lbs. 11 oz. |
| | 98 lbs. |

In this instance the borax and phosphates are present in equal proportions with the remaining balancing ingredients present in substantially the same relative amounts but the composition is without oxalic acid.

In a series of tests of the composition of scale and a variety of metals to determine the effectiveness of the composition in dissolving scale and the effectiveness of the inhibitor in preventing corrosion of metal the following results are shown.

Example XVIII

[Temp. 150° F.]

| Metal exposed | 10% Aqueous Sulfamic Acid Solution plus 0.5% Inhibitor of Example XVII | |
|---|---|---|
| | Metal loss 4 hrs. grms. | −Percent loss 4 hrs. |
| Iron (soft) | 0.002 | 0.0087 |
| Iron (hard) | 0.0008 | 0.0084 |
| Admiralty Metal | 0.002 | 0.0062 |
| Stainless Steel | None | None |
| Zinc (sheet, pure) | 0.628 | 4.6 |

Scale samples—disintegrated.
Scale samples in uninhibited acid—disintegrated.
Metal samples in uninhibited acid—progressive and continuous corrosion.

As noted in the several examples, a working level of concentration of acid is about 10%. It may be as low as 3% or as high as 20%. These concentrations are effective to give rapid rates of disintegration of scale and put enough water in the system so that the residual undissolved but disintegrated scale can be carried out of the system in suspension.

In all cases it is apparent that the inhibited acid has only a very insignificant effect on iron. Since iron is by far the most common metal encountered in processing equipment the virtues of the composition are apparent. Admiralty metal and brass are less common materials of construction which are effectively protected by the inhibitor. Copper, in pure form, is not soluble in acids by hydrogen displacement reaction, but impurities and contact with other metals will induce corrosion. The results reported in the examples clearly establish that it is protected. Zinc as such is far too reactive to be useful as a construction material in chemical apparatus, but even in this instance, results in the examples indicate a material reduction in the rate at which it is corroded.

The inhibitor will work efficiently over a long period of time, even beyond the life of the acid. In order to get the most out of the acid solution, it is preferred to employ in combination with the inhibitor a small amount of an organic chelating agent capable of sequestering polyvalent ions in solution resulting from disintegration and solution of, for example, boiler scale, thereby raising the saturation limit of the acid. A chelating agent found very satisfactory for the purpose when combined with the inhibitor is an alkali metal salt of an alkylene polyamine polycarboxylic acid (e.g. polyacetic acid), preferably an alkali metal salt of an alkylene polyamine tetraacetic acid of the following general formula:

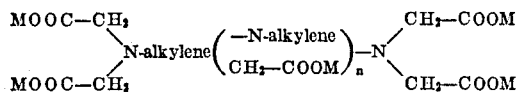

in which M is an alkali metal and $n$ is zero or a positive integer and in which none of the alkylene groups contains more than four carbon atoms. The other of these constituents is an alkali metal hydroxide.

The first of these constituents, when $n$ is zero, may be the tetra sodium (or potassium or other alkali metal) salt of ethylene diamine tetraacetic acid, or of propylene 1,2-diamine tetraacetic acid or of propylene 1,3-diamine tetraacetic acid. When $n$ is 1 this constituent may be the penta-alkali metal salt of diethylene triamine pentaacetic acid, or of the dipropylene triamine pentaacetic acids, etc. The sodium salt of ethylene diamine tetraacetic acid (known by the trademark Versene #9) is preferred.

When using the aforementioned type chelating agent in forming the inhibitor, about 0.5 to 4% by weight may be employed, preferably about 0.6 to 2%. Thus, the inhibitor may comprise broadly 50% to 95% by weight of an alkali metal compound selected from the group consisting of alkali metal phosphates, alkali metal borates and mixtures thereof, said chelating agent in the above indicated ranges and substantially the balance of the inhibitor comprising a mixture of lower alkyl thiourea and said complex organic reaction product, the proportion by weight of the lower alkyl thiourea to the complex organic reaction product ranging from 3:1 to 1:3.

When using the chelating agent, especially the sodium salt of ethylene diamine tetraacetic acid, it may be desirable to use a small amount of sodium benzoate in order to increase the inhibiting action. A wetting agent is also desirable as aforementioned.

A preferred composition of the inhibitor with the chelating agent is the following:

*Example XIX*

| | |
|---|---|
| Sodium borate | 70 to 95%. |
| Sodium tripolyphosphate | 2 to 8%. |
| Dibutylthiourea | 2 to 5%. |
| Complex organic reaction product (Rodine #113) | 2 to 5%. |
| Wetting agent (Pluronic #68) | 3 to 5%. |
| Sodium benzoate | up to 2% (preferably 0.4 to 1%). |
| Chelating agent (Versene #9) | 0.5 to 4% (preferably 0.6 to 2%). |

A commercial composition found to give excellent results in the trade is as follows:

*Example XX*

| | Percent |
|---|---|
| Sodium borate | 83.00 |
| Sodium tripolyphosphate | 4.625 |
| Dibutylthiourea | 3.687 |
| Complex organic reaction product (Rodine #113) | 3.687 |
| Wetting agent (Pluronic #68) | 3.626 |
| Sodium benzoate | .687 |
| Versene #9 | .688 |
| | 100.000 |

As has been stated, sodium benzoate and the wetting agent are optional and may be omitted.

A test using the foregoing composition in a sulfamic acid pickling solution gave the following results:

*Example XXI*

[Temp. 150–160° F.]

| Metal Exposed | 10% Sulfamic Acid Solution with 0.5% Inhibitor | |
|---|---|---|
| | Metal loss 4 hrs., gms. | —Percent loss 4 hrs. |
| Iron (strip) | .003 | .0138 |
| Iron (soft) | None | None |
| Steel (Stainless) | None | None |
| Copper | None | None |
| Aluminum | .0032 | .186 |
| Zinc | .3940 | 1.728 |
| Admiralty Metal | None | None |

In preparing the combined acid composition, sulfamic acid is advantageous because it is a very strong acid and is a solid crystalline, granular or powdery material and lends itself quite readily to being blended with the dry granular inhibitor. Dry compositions, suitable for direct solution in water at desired concentration levels can be formed with the borax or phosphates or those compounds in combination with the organic balancing ingredients of the overall combined inhibitor. Whether the sulfamic acid is dry blended with borax or phosphate alone, or with the full combined inhibitor, the preferred proportion to be used is 90–99 percent acid.

An example of a dry blend composition of sulfamic acid and the inhibitor is one comprising substantially sulfamic acid with about 3% to 5% by weight of inhibitor made up of about 92.4 parts by weight of borax, about 3.8 parts by weight of dibutyl thiourea, and about 3.8 parts by weight of the complex organic reaction product based on the reaction of an organic chloride with a coaltar base and with a water-soluble thiocyanate.

The grades of phosphate useful for the inhibitor are any of the alkali metal phosphates or polyphosphates which range from tri-sodium phosphate to tetra, penta, hexa, etc., poly and pyrophosphates. The same is true for the phosphates of potassium, lithium, etc. Many of these compounds are available in a variety of physical forms. It is essential insofar as the inhibitor is concerned to provide the phosphate or pyrophosphate radical.

The usual form of borate to be had for use in the inhibitor is borax. It is the borate or metaborate radical which is desired and the borate compound is used only as a source of this.

As has been stated herein, the use of wetting agents is optional. Pluronic 68 is based on polyoxypropylene with water-soluble polyoxyethylene groups added to both ends of the chain. The general formula is:

$$HO(C_2H_4O)_a(C_3H_6O)_b(C_2H_4O)_cH$$

$a$, $b$ and $c$ being positive integers or zero. Alkyl sulfonates may be used such as Nacconol NR (a sodium alkyl aryl sulfonate), also Duponol ME (alkyl sulfate), Fixanol (a quaternary ammonium salt), sodium lauryl sulfate, etc.

It will be apparent from the examples given that the inhibitor which is characterized by being a balanced alkali metal phosphate-alkali metal borate inhibitor containing several balancing ingredients to assist in preventing corrosion of the metals, that the proportions may be varied and, within the scope of the invention, the amount of phosphate-borate mixture may be varied from 50% of the inhibitor to as much as 90% to 95%. Thereafter the remaining portion of the inhibitor is composed of a lower alkyl thiourea, such as methyl, ethyl, propyl, butyl, pentyl in the mono- or dialkyl form, with a related amount of the complex reaction product of organic chloride-coal tar base-thiocyanate as described in U.S. Patent 2,403,153, the amounts of these latter two ingredients by weight being about equal, but variable within the range of about 1:3 to 3:1.

The inhibitor when prepared separately is a dry powder which may include optionally, in addition to the specified inhibiting ingredients, a small amount of an organic acid, such as oxalic, to aid in solubilizing the organic components in water. The wetting agent and the solubilizing ingredient need not exceed a total of 3 to 5% of the inhibitor by weight.

Just as the inhibitor is useful to prepare dry acid compositions with sulfamic acid, it is also useful with sodium bisulfate.

Though the invention has been described with reference to a limited number of specific examples, it is to be understood that variations thereof may be practiced without departing from the spirit and scope thereof.

What is claimed is:

1. In an aqueous acid cleaning composition based on an acid substance selected from the group consisting of sulfuric, sulfamic, phosphoric acids and an alkali metal bisulfate, the method of inhibiting the corrosive action of said composition on metals which comprises incorporating in said composition a corrosion inhibitor constituting about 3% to 10% by weight of the acid in the composition, said inhibitor having a composition consisting essentially of about 50% to 95% by weight of an alkali metal compound selected from the group consisting of sodium, potassium and lithium phosphates, and sodium, potassium and lithium borates, and mixtures thereof, substantially the balance of the inhibitor consisting essentially of a mixture of a lower alkyl thiourea and a complex organic reaction product of an organic chloride with a coal tar base and with a substance selected from the group consisting of water soluble inorganic thiocyanates and thiourea, the proportion by weight of the lower alkyl thiourea to the complex organic reaction product ranging from about 3:1 to 1:3.

2. The method of inhibiting the acid cleaning composition of claim 1 wherein the complex organic reaction product contained in the inhibitor is obtained as the reaction of an organic chloride with a coal tar base and with thiourea.

3. The method of inhibiting the acid cleaning composition of claim 1 wherein the inhibitor contains substantially equal parts by weight of said alkali metal phosphate and said alkali metal borate which together constitute about 85 to 90% by weight of the entire inhibitor composition.

4. An acid composition suitable for use in disintegrating boiler scale and further characterized by a substantially inhibited corrosive effect against metals, said composition consisting essentially of an acid substance selected from the group consisting of sulfuric, sulfamic, phosphoric acids and an alkali metal bisulfate containing a corrosion inhibitor comprising about 3% to 10% by weight of the said substance, said inhibitor consisting essentially of about 50% to 95% by weight of an alkali metal compound selected from the group consisting of sodium, potassium and lithium phosphates, and sodium, potassium and lithium borates and mixtures thereof, substantially the balance of the inhibitor consisting essentially of a mixture of a lower alkyl thiourea and a complex organic reaction product of an organic chloride with a coal tar base and with a substance selected from the group consisting of water-soluble inorganic thiocyanates and thiourea, the proportion by weight of the lower alkyl thiourea to the complex organic reaction product being of the order of about 3:1 to 1:3.

5. The acid composition of claim 4 wherein the complex organic reaction product contained in the inhibitor is obtained as the reaction of an organic chloride with a coal tar base and with thiourea.

6. An aqueous acid composition in accordance with claim 4, characterized in that the concentration of the acid substance ranges from about 3% to 20%, the amount of inhibitor being about 3% to 10% by weight of the acid substance present.

7. The acid composition as defined by claim 6 characterized in that the acid substance is sulfamic acid.

8. The acid composition as defined by claim 7 characterized in that the inhibitor consists essentially of equal parts by weight of said alkali metal phosphate and said alkali metal borate which together constitute about 85% to 90% by weight of the entire inhibitor composition.

9. An acid composition consisting essentially of a dry blend of about 90% to 99% of sulfamic acid by weight, substantially the balance constituting an inhibitor consisting essentially of about 50% to 95% by weight of an alkali metal compound selected from the group consisting of sodium, potassium and lithium phosphates, and sodium, potassium and lithium borates and mixtures thereof, substantially the balance of the inhibitor being comprised of a mixture of a lower alkyl thiourea and a complex organic reaction product of an organic chloride with a coal tar base and with a substance selected from the group consisting of water-soluble inorganic thiocyanates and thiourea, the proportion by weight of the lower alkyl thiourea to the complex organic reaction product being of the order of about 3:1 to 1:3.

10. The dry acid composition of claim 9 wherein the inhibitor consists essentially of a mixture of a sodium borate and a sodium phosphate, a lower alkyl thiourea and the complex organic reaction product based on the reaction of an organic chloride with a coal tar base and with thiourea.

11. The acid composition as defined in claim 9 wherein the alkali metal compound consists essentially of borax and the complex organic reaction product is obtained as the reaction of an organic chloride with a coal tar base and with a water-soluble inorganic thiocyanate.

12. An acid composition suitable for use in the disintegrating water-insoluble boiler scale consisting essentially or a bry blend of sulfamic acid with about 3% to 5% by weight of an inhibitor, said inhibitor consisting essentially of about 92.4 parts by weight of borax, about 3.8 parts by weight of a complex organic reaction product of an organic chloride with a coal tar base and with an inorganic thiocyanate, and about 3.8 parts by weight of dibutyl thiourea.

13. A corrosion inhibitor composition for an acid cleaning composition adapted to disintegrate boiler scale, said inhibitor having a composition consisting essentially of about 50% to 95% by weight of an alkali metal compound selected from the group consisting of sodium, potassium and lithium phosphates, and sodium, potassium and lithium borates and mixtures thereof, substantially the balance of the inhibitor consisting essentially of a mixture of a lower alkyl thiourea and a complex organic reaction product of an organic chloride with a coal tar base and with a substance selected from the group consisting of a water-soluble inorganic thiocyanates and thiourea, the proportion of the lower alkyl thiourea to the complex organic reaction product having a weight ratio of one to the other varying from about 3:1 to 1:3.

14. The inhibitor composition as defined in claim 13 wherein the inhibitor contains substantially equal parts by weight of said alkali metal phosphate and said alkali metal borate which together constitute about 85% to 90% by weight of the entire inhibitor composition, the balance of the inhibitor consisting essentially of substantially equal parts by weight of the lower alkyl thiourea and the complex organic reaction product.

15. The inhibitor of claim 13 consisting essentially of a blend of a sodium borate and a sodium phosphate, a lower alkyl thiourea and the complex organic reaction product obtained as the reaction of an organic chloride with a coal tar base and with thiourea.

16. The inhibitor composition as defined in claim 13 wherein the alkali metal compound consists essentially of about 50% to 95% by weight of borax and about equal parts by weight of dibutyl thiourea and the complex organic reaction product obtained as the reaction of an organic chloride with a coal tar base and with a water-soluble inorganic thiocyanate.

17. The inhibitor composition as defined in claim 13 wherein the alkali metal compound consists essentially of about 50% to 95% by weight of borax and about equal parts by weight of dibutyl thiourea and the complex organic reaction product obtained as the reaction of an organic chloride with a coal tar base and with thiourea.

18. The inhibitor composition as defined in claim 13, wherein said alkali metal compound consists essentially of about 50% to 95% by weight of an alkali metal phosphate and about equal parts by weight of dibutyl thiourea and the complex organic reaction product obtained as the reaction of an organic chloride with a coal tar base and with a water-soluble inorganic thiocyanate.

19. An inhibitor composition for use in inhibiting the acid corrosion of chemical processing equipment which consists essentially of about 92.4 parts by weight of borax, about 3.8 parts by weight of dibutyl thiourea and about 3.8 parts by weight of a complex organic reaction product obtained as the reaction of an organic chloride with a coal tar base and with a water-soluble inorganic thiocyanate.

20. An acid composition suitable for use in disintegrating boiler scale and further characterized by a substantially inhibited corrosive effect against metals, said composition consisting essentially of an acid substance selected from the group consisting of sulfuric, sulfamic, phosphoric acids and an alkali metal bisulfate containing a corrosion inhibitor consisting essentially of about 3% to 10% by weight of the acid substance, said inhibitor consisting essentially of about 50% to 95% by weight of an alkali metal compound selected from the group consisting of sodium, potassium and lithium phosphates, and sodium, potassium and lithium borates and mixtures thereof, about 0.5 to 4% by weight of a chelating agent consisting essentially of an alkali metal salt of an alkylene polyamine polycarboxylic acid, substantially the balance of the inhibitor consisting essentially of a mixture of a lower alkyl thiourea and a complex organic reaction product of an organic chloride with a coal tar base and with a substance selected from the group consisting of water-soluble inorganic thiocyanates and thiourea, the proportion by weight of the lower alkyl thiourea to the complex organic reaction product being of the order of about 3:1 to 1:3.

21. The acid composition of claim 20 wherein the chelating agent is a sodium salt of ethylene diamine tetraacetic acid.

22. The acid composition of claim 21 wherein the complex organic reaction product contained in the inhibitor is obtained as the reaction of an organic chloride with a coal tar base and with thiourea.

23. An aqueous acid composition in accordance with claim 22 characterized in that the concentration of the acid substance ranges from about 3% to 20%, the amount of inhibitor being about 3% to 10% by weight of the acid substance present.

24. An acid composition consisting essentially of a dry blend of about 90% to 99% of sulfamic acid by weight, substantially the balance constituting an inhibitor consisting essentially of about 50% to 95% by weight of an alkali metal compound selected from the group consisting of sodium, potassium and lithium phosphates, and sodium, potassium and lithium borates and mixtures thereof, about 0.5 to 4% of a chelating agent consisting essentially of an alkali metal salt of an alkylene polyamine carboxylic acid, substantially the balance of the inhibitor consisting essentially of a mixture of a lower alkyl thiourea and a complex organic reaction product of an organic chloride with a coal tar base and with a substance selected from the group consisting of water-soluble inorganic thiocyanates and thiourea, the proportion by weight of the lower alkyl thiourea to the complex organic reaction product being of the order of about 3:1 to 1:3.

25. The dry acid composition of claim 24 wherein the inhibitor consists essentially of a mixture of a sodium borate and a sodium phosphate, a sodium salt of ethylene diamine tetraacetic acid as the chelating agent, and a complex organic reaction product obtained as the reaction of an organic chloride with a coal tar base and with thiourea.

26. A corrosion inhibitor composition for an acid cleaning composition adapted to disintegrate boiler scale, said inhibitor having a composition consisting essentially of about 50% to 95% by weight of alkali metal compound selected from the group consisting of sodium, potassium and lithium phosphates, and sodium, potassium and lithium borates and mixtures thereof, about 0.5 to 4% of a chelating agent consisting essentially of an alkali metal salt of an alkylene polyamine polycarboxylic acid, substantially the balance of the inhibitor consisting essentially of a mixture of a lower alkyl thiourea and a complex organic reaction product of an organic chloride with a coal tar base and with a substance selected from the group consisting of water-soluble inorganic thiocyanates and thiourea, the proportion of the lower alkyl thiourea to the complex organic reaction product having a weight ratio of one to the other varying from about 3:1 to 1:3.

References Cited in the file of this patent

UNITED STATES PATENTS

| 1,608,622 | Schmidt | Nov. 30, 1926 |
| --- | --- | --- |
| 2,225,294 | Bolton et al. | Dec. 17, 1940 |
| 2,316,220 | Brown | Apr. 13, 1943 |
| 2,384,553 | Kiffer | Sept. 11, 1945 |
| 2,403,153 | Saukaitis | July 2, 1946 |
| 2,418,955 | Shawcross | Apr. 15, 1947 |
| 2,593,259 | Brissey et al. | Apr. 15, 1952 |
| 2,617,771 | Rucker | Nov. 11, 1952 |

FOREIGN PATENTS

| 569,138 | Great Britain | May 7, 1945 |
| --- | --- | --- |

OTHER REFERENCES

Sequestrene, pub. by Geigy Industrial Chemicals, N.Y. (1952), pages 1–12.